United States Patent

Puckett et al.

(10) Patent No.: US 11,061,225 B2
(45) Date of Patent: Jul. 13, 2021

(54) OPTICAL PHASED ARRAY BASED ON EMITTERS DISTRIBUTED AROUND PERIMETER

(71) Applicant: Honeywell International Inc., Morris Plains, NJ (US)

(72) Inventors: Matthew Wade Puckett, Scottsdale, AZ (US); Neil A. Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 119 days.

(21) Appl. No.: 16/359,789

(22) Filed: Mar. 20, 2019

(65) Prior Publication Data

US 2019/0331913 A1 Oct. 31, 2019

Related U.S. Application Data

(60) Provisional application No. 62/663,897, filed on Apr. 27, 2018.

(51) Int. Cl.
| | |
|---|---|
| *G02B 27/00* | (2006.01) |
| *G01S 7/481* | (2006.01) |
| *G01S 17/88* | (2006.01) |
| *G02F 1/29* | (2006.01) |

(52) U.S. Cl.
CPC .......... *G02B 27/0087* (2013.01); *G01S 7/481* (2013.01); *G01S 17/88* (2013.01); *G02F 1/292* (2013.01)

(58) Field of Classification Search
CPC ....... G02B 27/0087; G01S 7/481; G01S 7/88; G02F 1/292

USPC .......................................................... 359/303
See application file for complete search history.

(56) References Cited

U.S. PATENT DOCUMENTS

| | | | |
|---|---|---|---|
| 4,940,303 A | 7/1990 | Abeles et al. | |
| 6,128,421 A | 10/2000 | Roberts | |
| 9,322,911 B1* | 4/2016 | Sacco | H01Q 3/34 |
| 9,614,280 B2* | 4/2017 | Shi | H01Q 3/2676 |
| 10,224,641 B2* | 3/2019 | Sundaram | H01Q 1/24 |
| 2015/0123873 A1* | 5/2015 | Perumana | H01Q 21/30 343/876 |
| 2015/0346340 A1 | 12/2015 | Yaacobi et al. | |

(Continued)

FOREIGN PATENT DOCUMENTS

| | | |
|---|---|---|
| CN | 103094837 A | 5/2013 |
| CN | 107422569 A | 12/2017 |

(Continued)

OTHER PUBLICATIONS

European Patent Office, "Partial European Search Report from EP Application No. 19170718.1 dated Sep. 4, 2019", from Foreign Counterpart to U.S. Appl. No. 16/359,789, pp. 1-15, Published: EP.

(Continued)

*Primary Examiner* — Collin X Beatty
(74) *Attorney, Agent, or Firm* — Fogg & Powers LLC

(57) ABSTRACT

An emitter configuration layout for an optical phased array comprises a plurality of emitters arranged around a perimeter, and a plurality of waveguides, with each of the waveguides respectively coupled to one of the emitters. The plurality of emitters are operative to generate a single far-field peak.

16 Claims, 14 Drawing Sheets

(56) References Cited

U.S. PATENT DOCUMENTS

| | | | | |
|---|---|---|---|---|
| 2018/0039153 A1* | 2/2018 | Hashemi | ............ | G02F 1/292 |
| 2018/0366825 A1* | 12/2018 | Klemes | ............ | H01Q 3/44 |
| 2019/0132052 A1* | 5/2019 | Darbinian | ............ | H04B 10/11 |

FOREIGN PATENT DOCUMENTS

| | | | |
|---|---|---|---|
| CN | 108169979 A | | 6/2018 |
| CN | 108227334 A | | 6/2018 |
| EP | 3451054 A1 | | 3/2019 |
| JP | 2017003688 A | | 1/2017 |

OTHER PUBLICATIONS

Liu et al., "Circular Optical Phased Array for 360° Constant Amplitude Scanning", Tenth International Conference on Information Optics and Photonics, Beijing, China, Nov. 15, 2018, pp. 1-6.
McManamon et al., "Optical Phased Array Technology", Proceedings of the IEEE, vol. 84, No. 2, Feb. 1996, pp. 268-298.
Zhang et al., "Fast and Wide-Range Optical Beam Steering with Ultralow Side Lobes by Applying and Optimized Multi-Circular Optical Phased Array", Applied Optics, vol. 57, No. 18, Jun. 20, 2018, pp. 4977-4984.
European Patent Office, "Extended European Search Report from EP Application No. 19170718.1", from Foreign Counterpart to U.S. Appl. No. 16/359,789, dated Dec. 11, 2019, pp. 1-12, Published: EP.
European Patent Office, "Communication pursuant to Article 94(3) EPC from EP Application No. 19170718.1", from Foreign Counterpart to U.S. Appl. No. 16/359,789, dated Sep. 11, 2020, pp. 1 through 7, Published: EP.

\* cited by examiner

OPTICAL PHASED ARRAY BASED ON EMITTERS DISTRIBUTED AROUND PERIMETER

CROSS REFERENCE TO RELATED APPLICATION

This application claims the benefit of priority to U.S. Provisional Application No. 62/663,897, filed on Apr. 27, 2018, which is herein incorporated by reference.

BACKGROUND

There are numerous applications for which it is desirable to steer the direction of emission of a beam of light without the use of any moving parts. To this end, efforts have been made to design chip-scale optical phased arrays based on integrated photonics components. While breakthroughs have been made in one-dimensional beam steering and, to a lesser extent, two-dimensional beam steering, improvements in these technologies are still needed.

For example, a major limitation currently faced by two-dimensional beam steering is the inability to space individual emitters of an array (N×N) close enough to one another, which ideally should be at one-half wavelength (lambda/2). This results from the requirement for optically isolated waveguides to propagate among the emitters. This limitation translates to a limited steering range, as well as an increased number of emitted beams and a reduced power level in the beam of interest.

SUMMARY

An emitter configuration layout for an optical phased array comprises a plurality of emitters arranged around a perimeter, and a plurality of waveguides, with each of the waveguides respectively coupled to one of the emitters. The plurality of emitters are operative to generate a single far-field peak.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various emitter configurations for optical phased arrays are disclosed herein. The emitter configurations include a plurality of emitters arranged around a perimeter, and a plurality of waveguides that are each respectively coupled to one of the emitters. In some embodiments, the emitters can be arranged around the perimeter such that none of the waveguides are located between any of the emitters. The emitter configurations are operative to generate a single far-field peak.

The emitters can be arranged in various geometric patterns or shapes around the perimeter. In principle, the perimeter can encompass a variety of different shapes. In some embodiments, performance is enhanced for perimeter shapes possessing greater levels of radial symmetry. For example, the emitters can form a circular pattern around the perimeter, an elliptical pattern around the perimeter, a semi-circular pattern around the perimeter, or the like.

The present approach solves the problem of prior emitter arrays by rearranging the emitters around a perimeter. For example, instead of positioning the emitters in an N×N array configuration, the present emitters can be spaced equidistant along the perimeter, such as in a circular arrangement with a given radius. In such embodiments, there is no requirement for waveguides to pass among the emitters, and so the emitters can be placed much closer together than in conventional optical phased arrays.

An optical phased array based on the present emitter configurations can be fabricated using integrated optical waveguides through standard fabrication processes. For example, the waveguide design can include a 1×N splitter, N phase modulators (which may operate based on one of a number of effects), and a configuration of grating-assisted emitters. Driving electrodes for phase shifters can be included in the fabrication.

To operate an optical phased array device with the present emitter configuration, laser light is injected into an input waveguide facet. The phases of the N waveguide arms are controlled to control the direction of emission of the emitted beam.

Simulations have verified that various circular emitter configurations result in an improved steering range for the emitted beam, as well as better transfer of optical power into the single beam of interest.

The present emitter configurations can be implemented in various integrated photonics applications, light detection and ranging (LiDAR) systems, free-space optical communication systems, or the like.

Further details of various embodiments are described hereafter with reference to the drawings.

Figure 1:
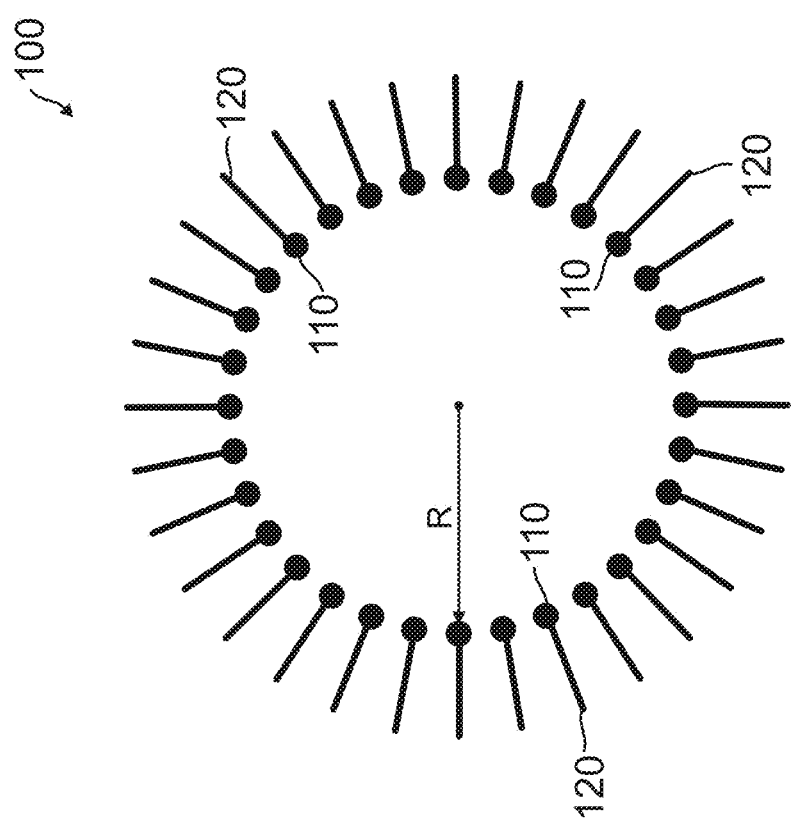
FIG. 1 is a schematic diagram of a circular emitter configuration layout for an optical phased array, according to one embodiment.

FIG. 1 illustrates an emitter configuration layout 100 for an optical phased array, according to one embodiment. The emitter configuration layout 100 includes a plurality of emitters 110 each with a given emitter spot size, and arranged in a circular pattern, with a given radius (R), around a perimeter. The emitters 110 are each coupled to a respective waveguide 120. In this embodiment, there are no waveguides between each of the emitters 110, which provides for a reduced pitch.

Figure 2A:
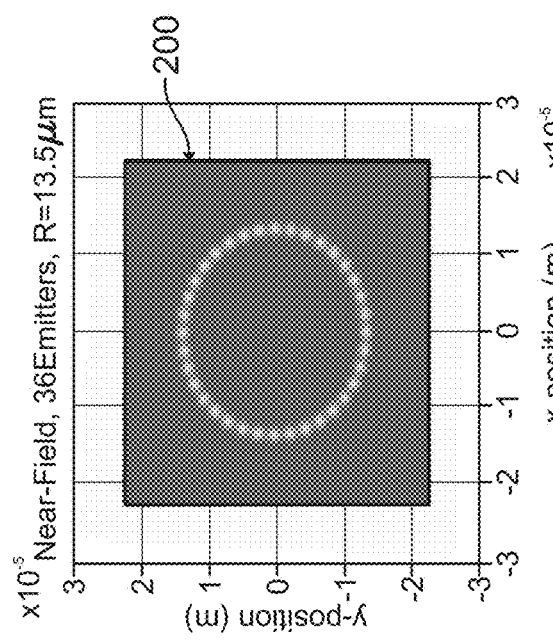
FIGS. 2A-2C are emission profiles from numerically generated simulations corresponding to the emitter configuration layout of FIG. 1.
Figure 2C:
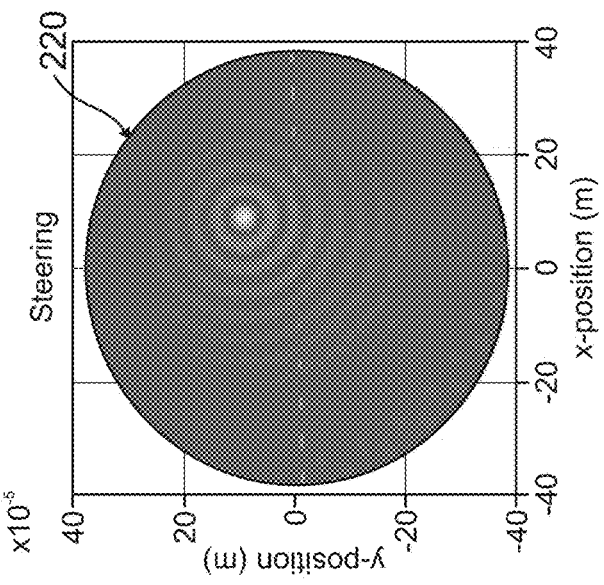
Figure 2B:
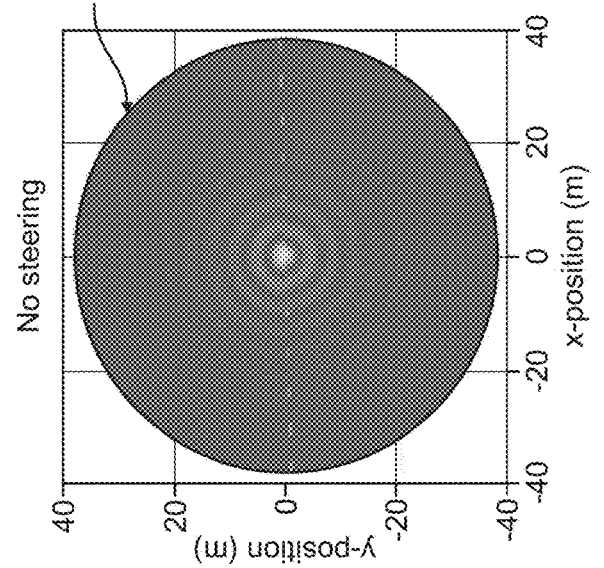

FIGS. 2A-2C are emission profiles from numerically generated simulations corresponding to emitter configuration layout 100. FIG. 2A is a near-field emission profile 200 for 36 emitters in a circular configuration having a radius (R) of 13.5 µm. FIG. 2B is a far-field emission profile 210 of the light generated by the 36 emitters with no steering of a central lobe, and FIG. 2C is a far-field emission profile 220 of the light generated by the 36 emitters with steering of the central lobe. As shown in FIGS. 2B and 2C, a single peak (central lobe) is generated in the far-field by the circular configuration.

Figure 3:
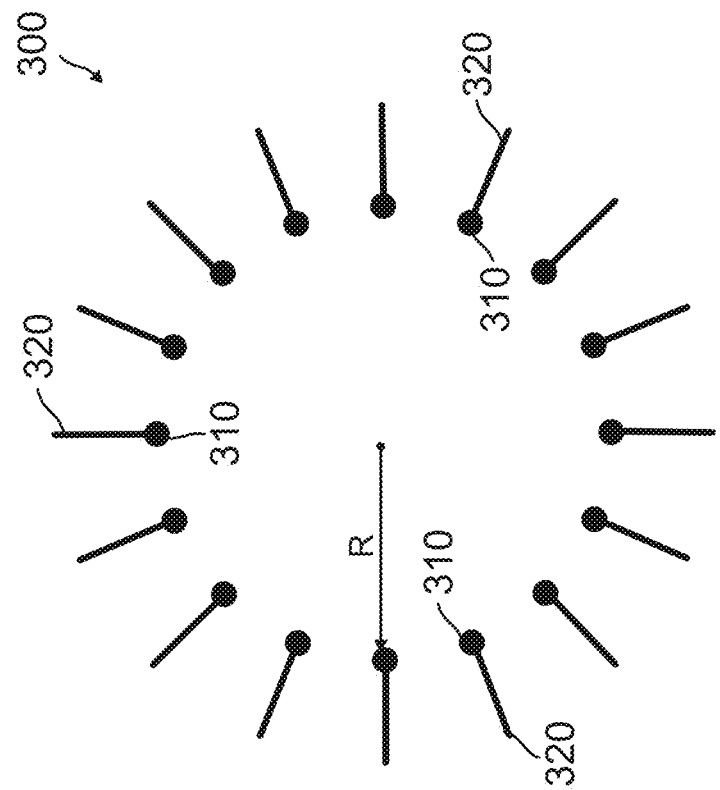
FIG. 3 is a schematic diagram of a circular emitter configuration layout for an optical phased array, according to another embodiment.

FIG. 3 illustrates an emitter configuration layout 300 for an optical phased array, according to another embodiment. The emitter configuration layout 300 includes a plurality of emitters 310 arranged in a circular pattern, with a given radius (R), around a perimeter. The emitter configuration layout 300 has a reduced number of emitters compared to the embodiment of FIG. 1. The emitters 310 are each coupled to a respective waveguide 320. As shown in FIG. 3, there are no waveguides between each of the emitters 310.

Figure 4A:
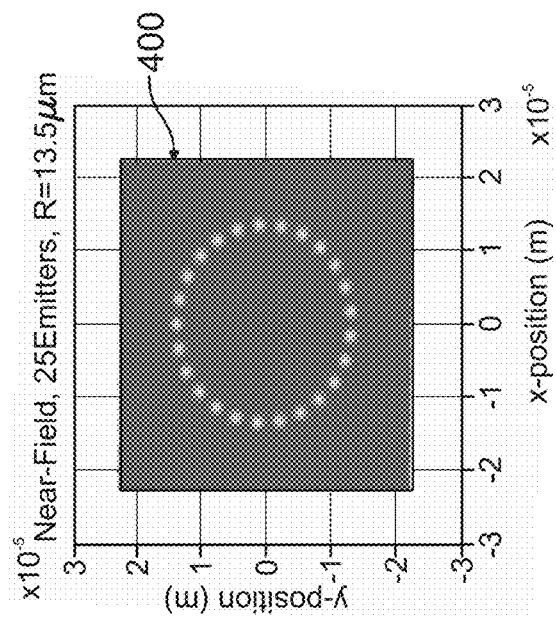
FIGS. 4A-4C are emission profiles from numerically generated simulations corresponding to the emitter configuration layout of FIG. 3.
Figure 4C:
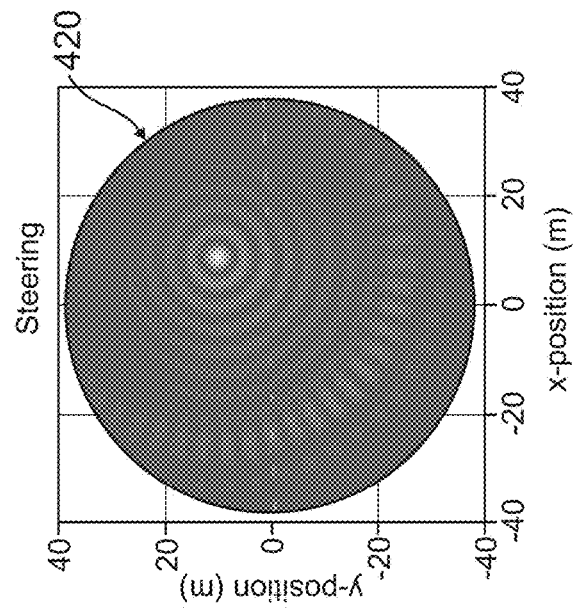
Figure 4B:
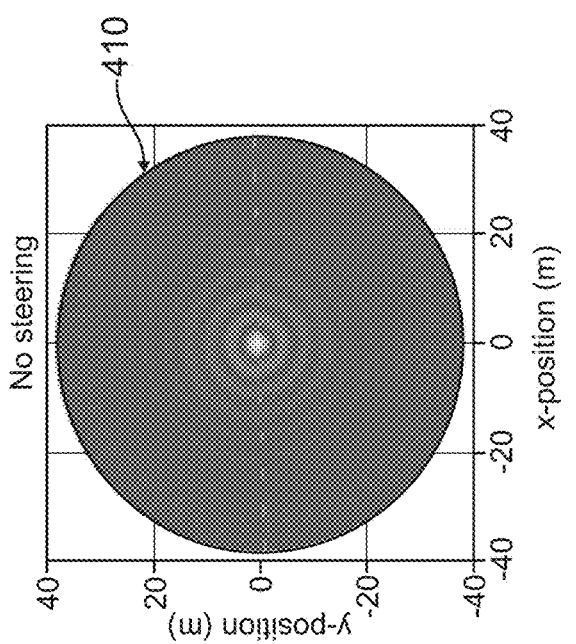

FIGS. 4A-4C are emission profiles from numerically generated simulations corresponding to emitter configuration layout 300. FIG. 4A is a near-field emission profile 400 for 25 emitters in a circular configuration having a radius of 13.5 µm. FIG. 4B is a far-field emission profile 410 of the light generated by the 25 emitters with no steering of a central lobe, and FIG. 4C is a far-field emission profile 420 of the light generated by the 25 emitters with steering of the central lobe. Note that for this reduced number of emitters, the quality of the far-field emission at emission angles sufficiently different from the central lobe is decreased.

Figure 5:
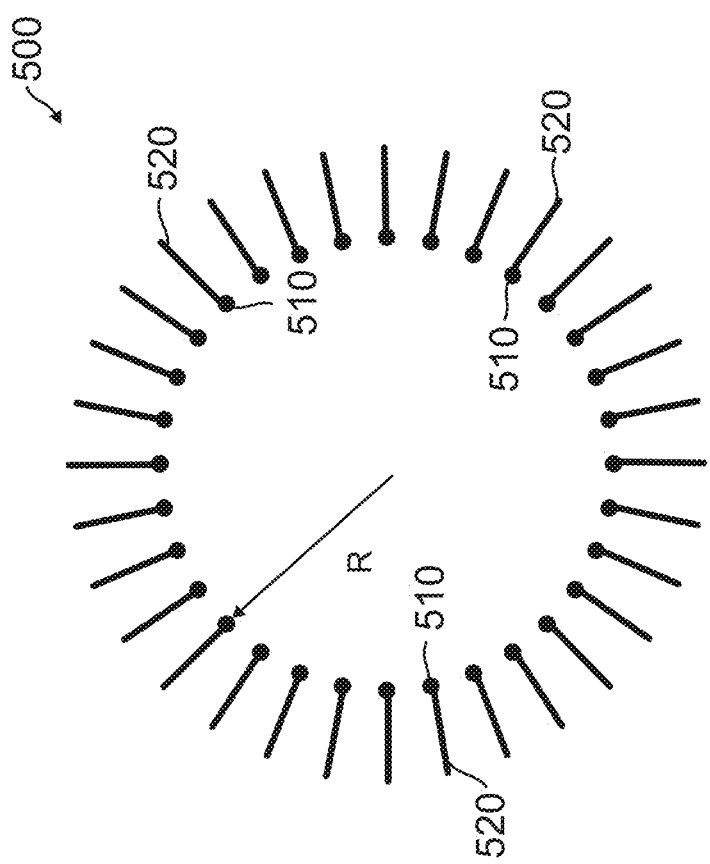
FIG. 5 is a schematic diagram of a circular emitter configuration layout for an optical phased array, according to a further embodiment.

FIG. 5 illustrates an emitter configuration layout 500 for an optical phased array, according to a further embodiment. The emitter configuration layout 500 includes a plurality of emitters 510 arranged in a circular pattern, with a given radius (R), around a perimeter. The emitter configuration layout 500 has a reduced emitter spot size compared to the emitter spot size of the embodiment of FIG. 1. The emitters 510 are each coupled to a respective waveguide 520. As shown in FIG. 5, there are no waveguides between each of the emitters 510. Reducing the emitter spot size gives a wider steering range.

Figure 6A:
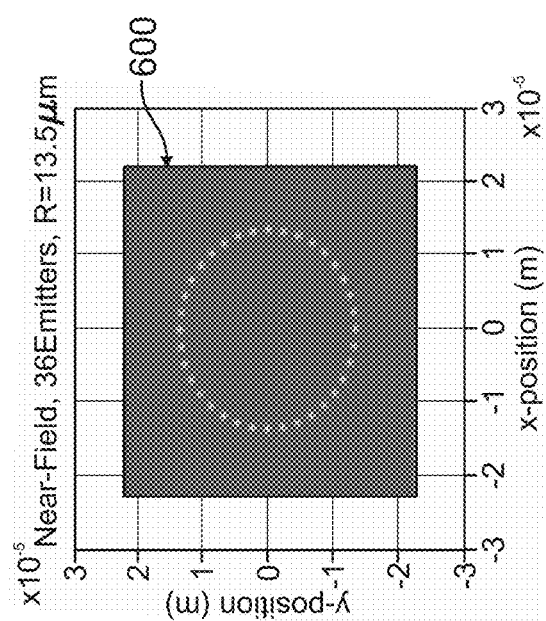
FIGS. 6A-6C are emission profiles from numerically generated simulations corresponding to the emitter configuration layout of FIG. 5.
Figure 6C:
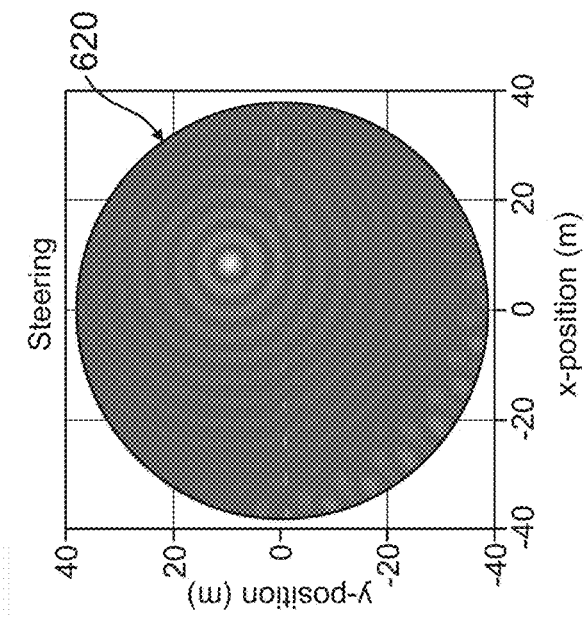
Figure 6B:
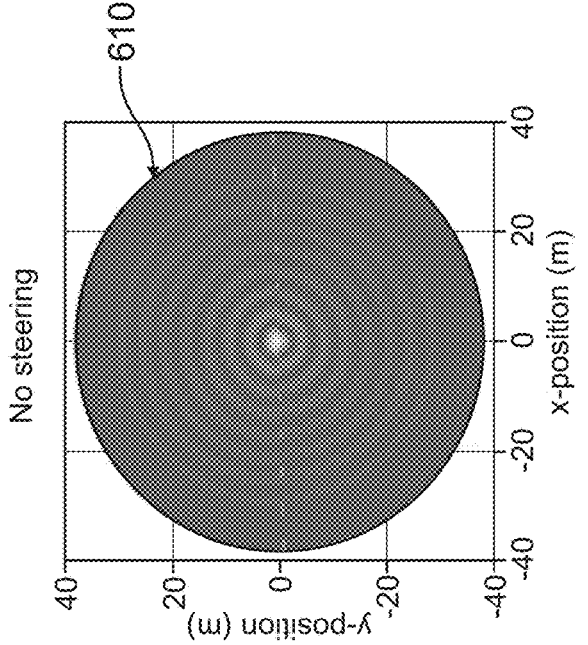

FIGS. 6A-6C are emission profiles from numerically generated simulations corresponding to emitter configuration layout 500. FIG. 6A is a near-field emission profile 600 for 36 emitters in a circular configuration having a radius of 13.5 µm. FIG. 6B is a far-field emission profile 610 of the light generated by the 36 emitters with no steering of a central lobe, and FIG. 6C is a far-field emission profile 620 of the light generated by the 36 emitters with steering of the central lobe.

Figure 7:
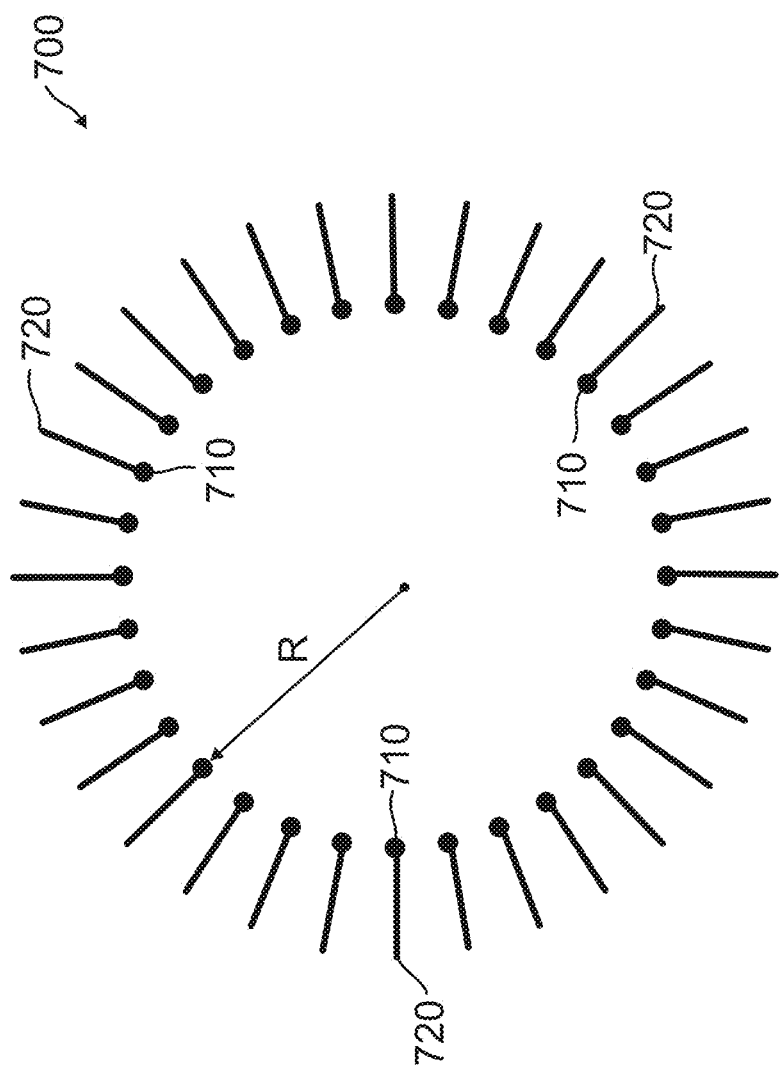
FIG. 7 is a schematic diagram of a circular emitter configuration layout for an optical phased array, according to another embodiment.

FIG. 7 illustrates an emitter configuration layout 700 for an optical phased array, according to another embodiment. The emitter configuration layout 700 includes a plurality of emitters 710 arranged in a circular pattern, with a given radius (R), around a perimeter. The emitter configuration layout 700 has an increased configuration radius compared to the embodiment of FIG. 1. The emitters 710 are each coupled to a respective waveguide 720. As shown in FIG. 7, there are no waveguides between each of the emitters 710.

Figure 8A:
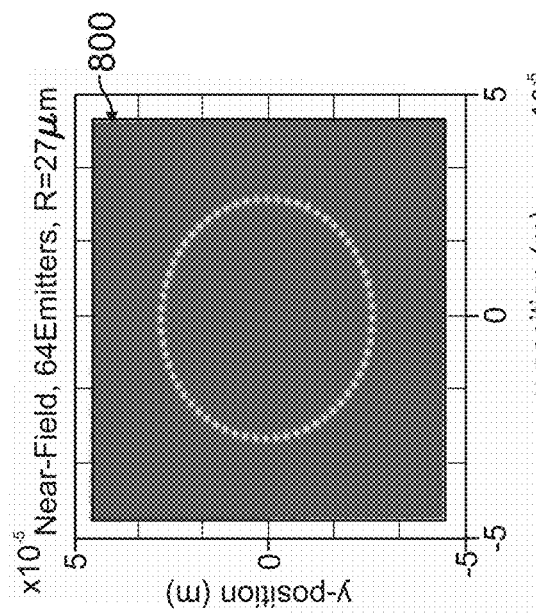
FIGS. 8A-8C are emission profiles from numerically generated simulations corresponding to the emitter configuration layout of FIG. 7.
Figure 8C:
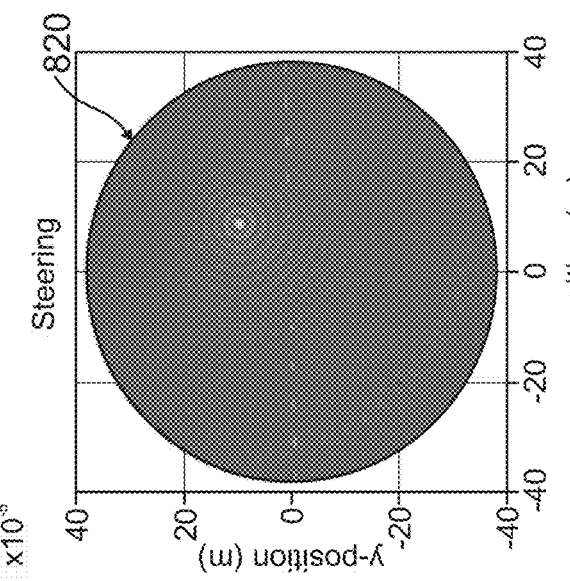
Figure 8B:
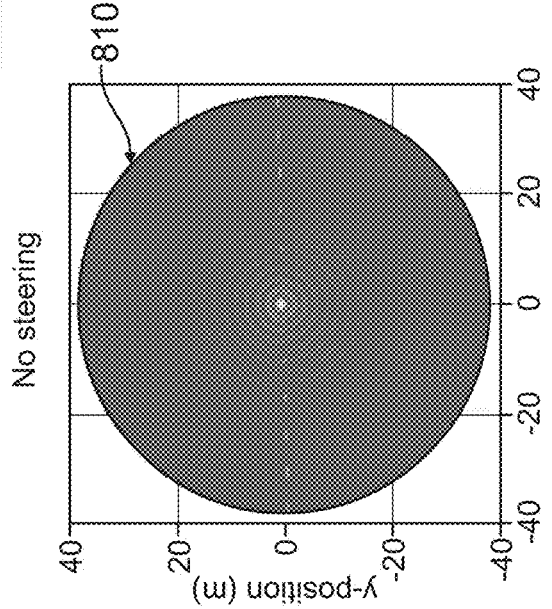

FIGS. 8A-8C are emission profiles from numerically generated simulations corresponding to emitter configuration layout 700. FIG. 8A is a near-field emission profile 800 for 64 emitters in a circular configuration having a radius of 27 µm. FIG. 8B is a far-field emission profile 810 of the light generated by the 64 emitters with no steering of a central lobe, and FIG. 8C is a far-field emission profile 820 of the light generated by the 64 emitters with steering of the central lobe. As shown in FIGS. 8B and 8C, increasing the configuration radius decreases the central spot size and reduces the spacing of the fringes around the central lobe in the far-field.

Figure 9:
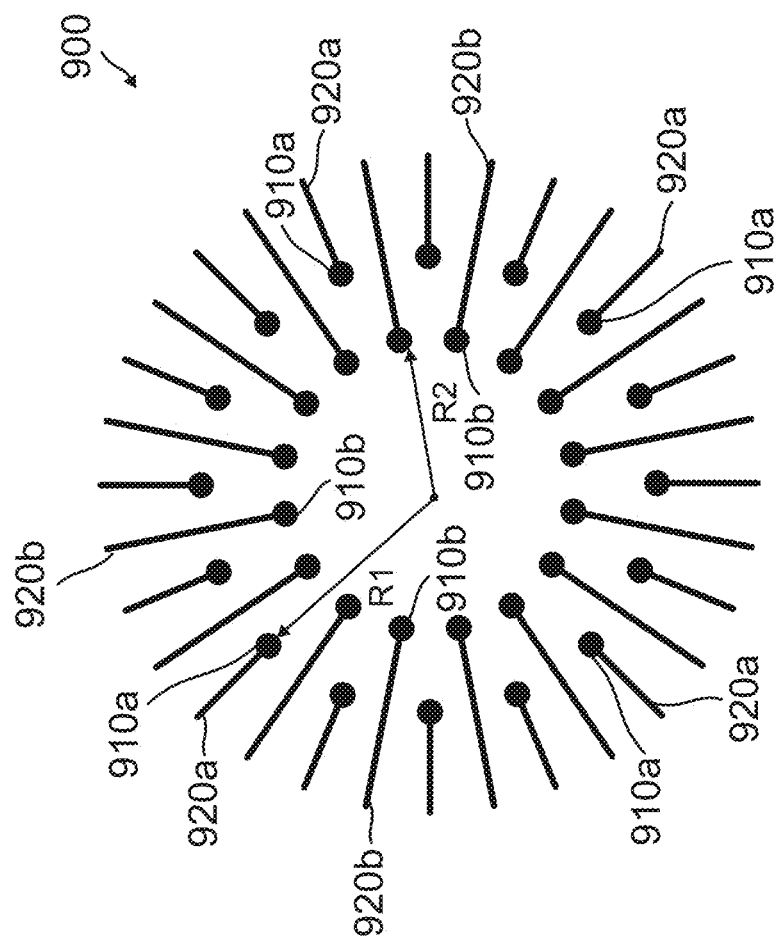
FIG. 9 is a schematic diagram of an emitter configuration layout for an optical phased array, according to an alternative embodiment.

FIG. 9 illustrates an emitter configuration layout 900 of an optical phased array, according to a further embodiment. The emitter configuration layout 900 includes a plurality of emitters in a dual ring configuration, including an outer ring of emitters 910a arranged in a circular pattern with first radius ($R_1$), and an inner ring of emitters 910b arranged in a circular pattern with a second radius ($R_2$) that is less than the first radius. The emitters 910a are each coupled to a respective waveguide 920a, and the emitters 910b are each coupled to a respective waveguide 920b. The outer ring of emitters 910a are each positioned so as to be offset from the inner ring of emitters 910b, such that the waveguides 920b coupled to the inner ring of emitters 910b respectively extend between a pair of adjacent outer ring emitters 910a.

Figure 10A:
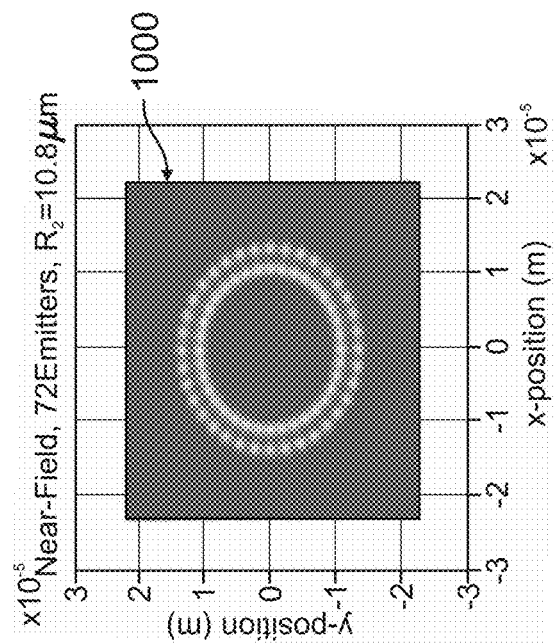
FIGS. 10A-10C are emission profiles from numerically generated simulations corresponding to the emitter configuration layout of FIG. 9.
Figure 10C:
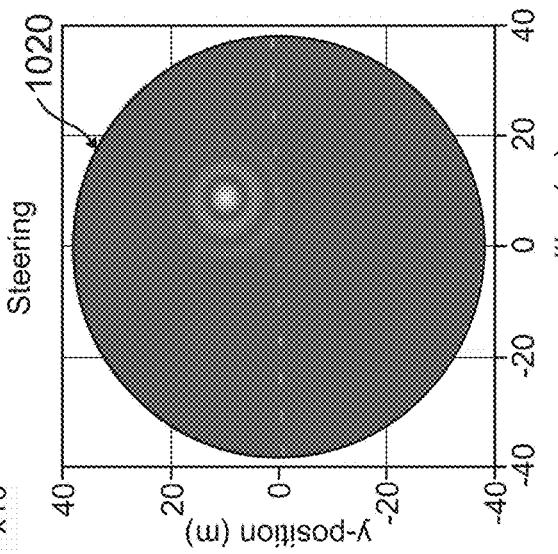
Figure 10B:
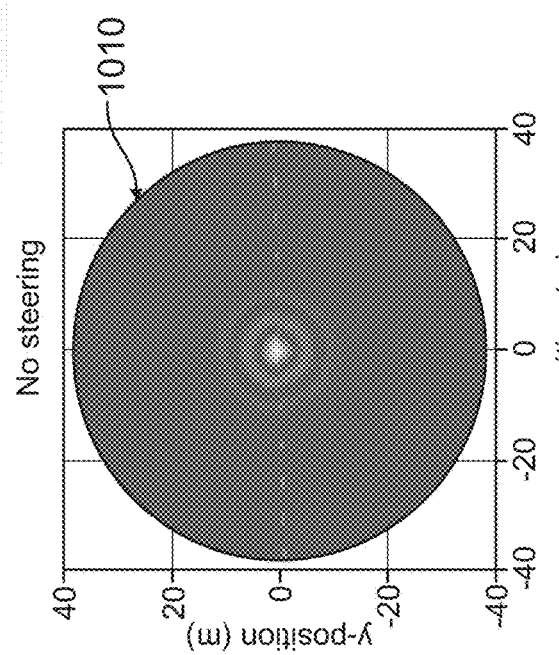

FIGS. 10A-10C are emission profiles from numerically generated simulations corresponding to emitter configuration layout 900. FIG. 10A is a near-field emission profile 1000 for 72 emitters in a dual ring configuration, with an inner radius ($R_2$) of 10.8 µm. FIG. 10B is a far-field emission profile 1010 of the light generated by the 72 emitters with no steering of a central lobe, and FIG. 10C is a far-field emission profile 1020 of the light generated by the 72 emitters with steering of the central lobe. As shown in FIGS. 10B and 10C, the dual ring configuration suppresses the fringes around the central lobe in the far-field.

While two concentric rings of emitters are shown in the embodiment of FIG. 9, it should be understood that three or more concentric rings of emitters can be used in alternative embodiments, to provide for even greater fringe suppression.

Figure 11:
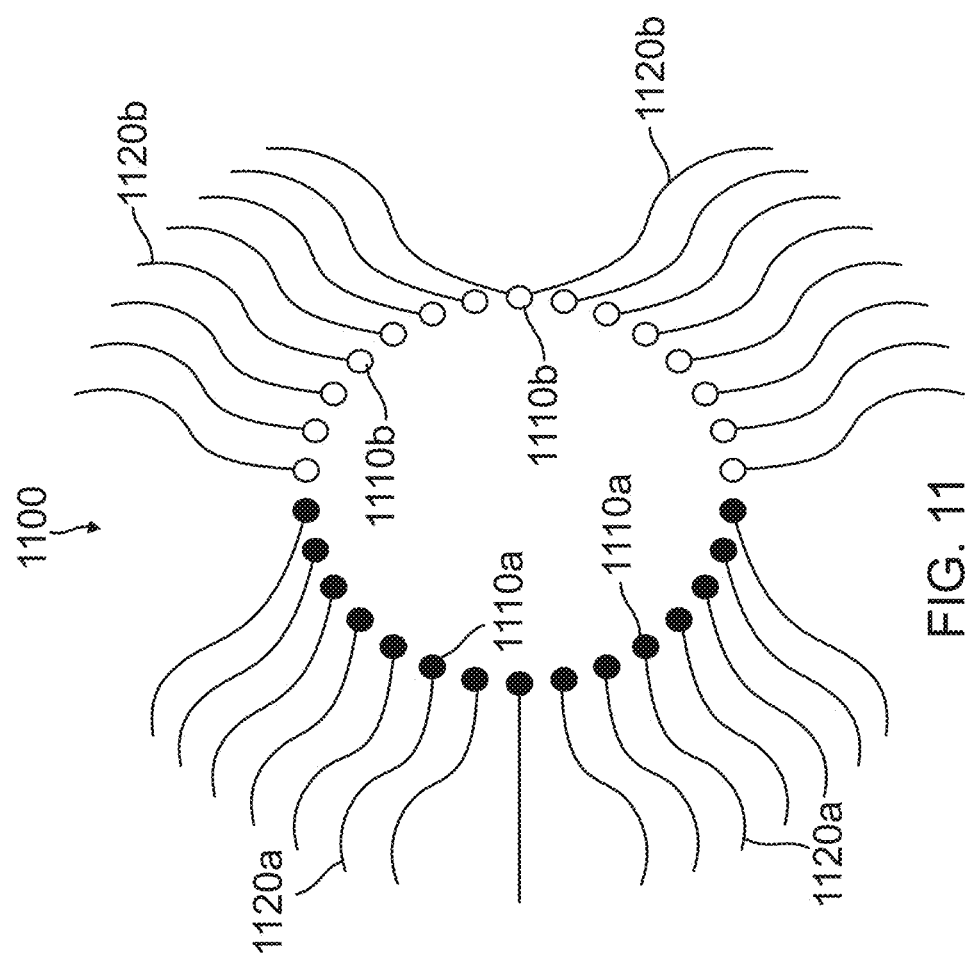
FIG. 11 is a schematic diagram of an emitter configuration layout for an optical phased array, according to another alternative embodiment.

FIG. 11 illustrates an emitter configuration layout 1100 of an optical phased array, according to an alternative embodiment. The emitter configuration layout 1100 comprises a plurality of emitters arranged to have two independent polarizations, including a first set of emitters 1110a having a first polarization and a second set of emitters 1110b have a second polarization that is different than the first polarization. In one embodiment, the first set of emitters 1110*a* are arranged in a first semi-circular pattern, and the second set of emitters 1110*b* are arranged in a second semi-circular pattern that faces the first semi-circular pattern. The emitters 1110*a* are each coupled to a respective waveguide 1120*a*, and the emitters 1110*b* are each coupled to a respective waveguide 1120*b*.

Figure 12A:
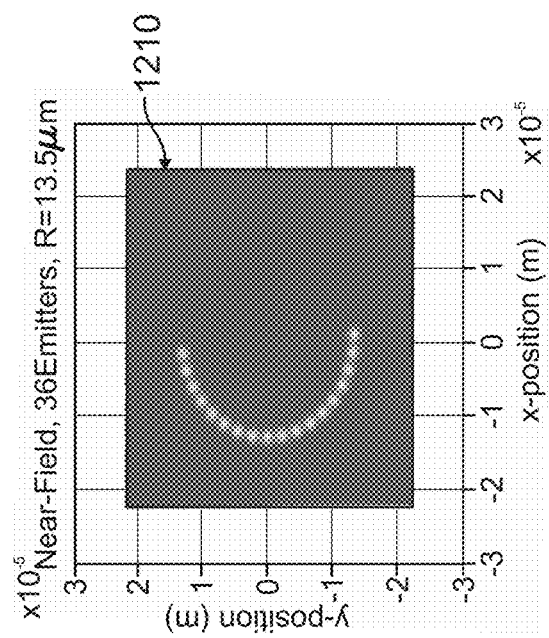
FIGS. 12A-12C are emission profiles from numerically generated simulations corresponding to the emitter configuration layout of FIG. 11.
Figure 12C:
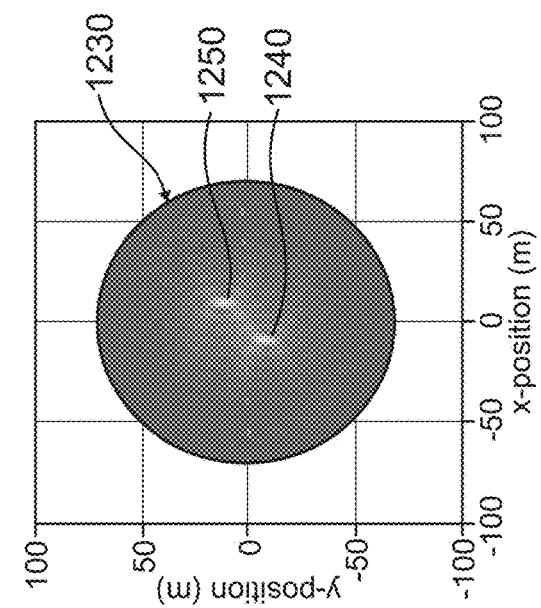
Figure 12B:
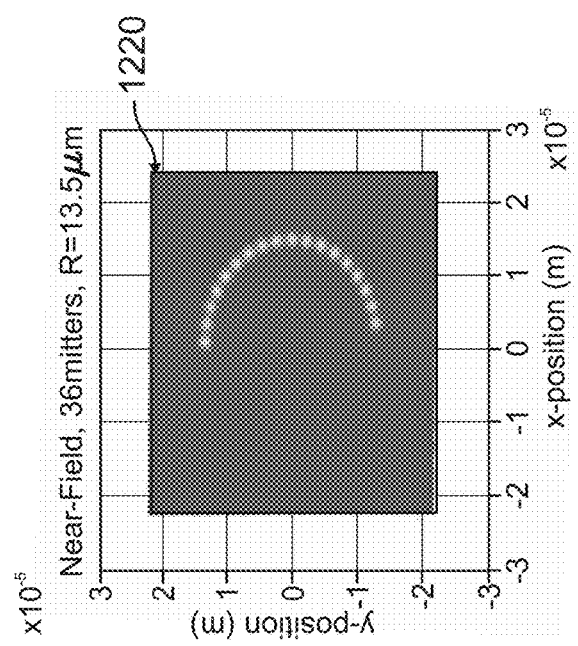

FIGS. 12A-12C are emission profiles from numerically generated simulations corresponding to emitter configuration layout 1100. FIG. 12A is a near-field emission profile 1210 for one half of a 36 emitter configuration having a radius of 13.5 µm, in which the emitters have a first polarization. FIG. 12B is a near-field emission profile 1220 for the other half of the 36 emitter configuration, in which the emitters have a second polarization that is different than the first polarization. FIG. 12C is a far-field emission profile 1230 of the light generated by the 36 emitter configuration, including a first lobe 1240 generated by the emitters with the first polarization (FIG. 12A), and a second lobe 1250 generated by the emitters with the second polarization (FIG. 12B).

While the two beams corresponding to first lobe 1240 and second lobe 1250 are separate beams possessing orthogonal polarization states, these two beams can be made to track each other, such that the beams overlap in the far-field. The orthogonal polarization states prevent interference between the two beams. This enables the two beams to contain and transmit separate data streams, such as polarization multiplexed data, while minimizing cross-talk between the data streams.

Figure 13:
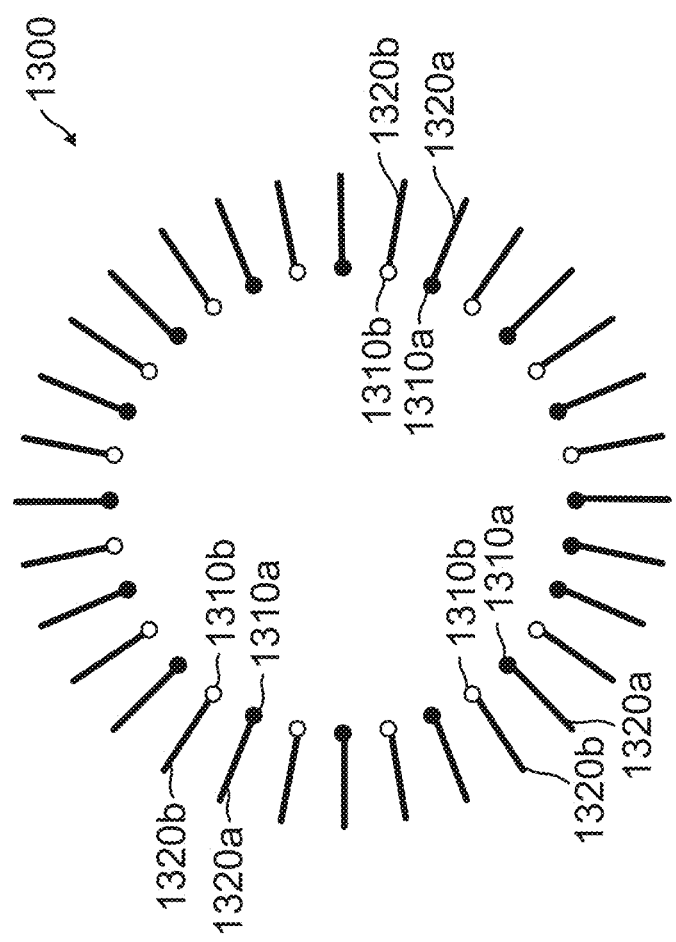
FIG. 13 is a schematic diagram of an emitter configuration layout for an optical phased array, according to a further alternative embodiment.

FIG. 13 illustrates an emitter configuration layout 1300 of an optical phased array, according to a further alternative embodiment. The emitter configuration layout 1300 comprises a plurality of emitters arranged to have two independent phase gradients in a circular pattern. A first set of emitters 1310*a* have a first phase gradient and are alternatingly arranged with a second set of emitters 1310*b* having a second phase gradient that is different than the first phase gradient. The emitters 1310*a* are each coupled to a respective waveguide 1320*a*, and the emitters 1310*b* are each coupled to a respective waveguide 1320*b*.

Figure 14A:
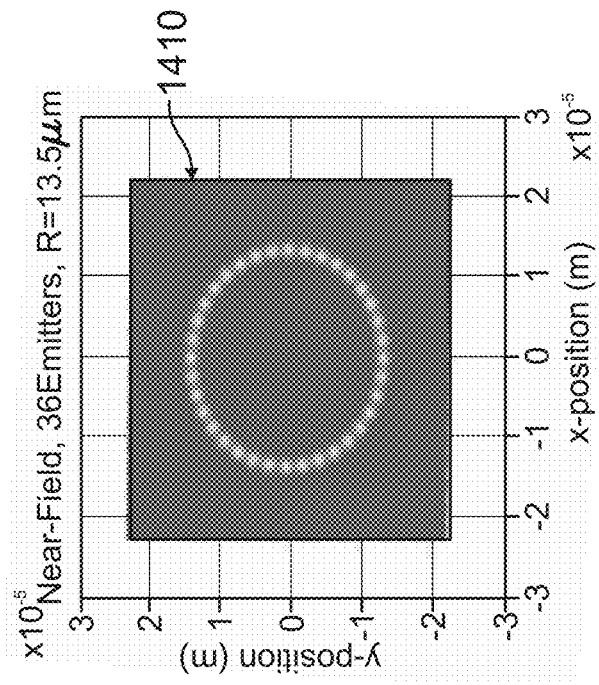
FIGS. 14A and 14B are emission profiles from numerically generated simulations corresponding to the emitter configuration layout of FIG. 13.
Figure 14B:
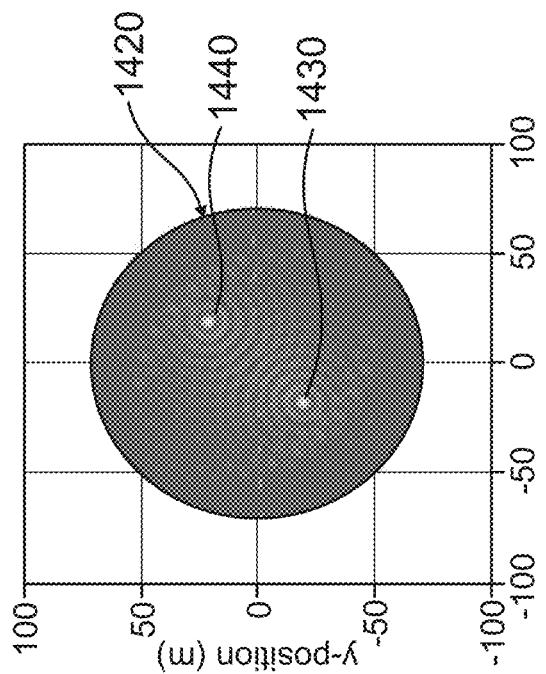

FIGS. 14A and 14B are emission profiles from numerically generated simulations corresponding to emitter configuration layout 1300. FIG. 14A is a near-field emission profile 1410 for a 36 emitter configuration having a radius of 13.5 µm, in which the emitters have alternating independent phase gradients. FIG. 14B is a far-field emission profile 1420 of the light generated by the 36 emitter configuration, including a first lobe 1430 and a second lobe 1440. In this implementation, the beams corresponding to first lobe 1430 and second lobe 1440 are two separate beams that can be independently steered and controlled.

EXAMPLE EMBODIMENTS

Example 1 includes an emitter configuration layout for an optical phased array, comprising: a plurality of emitters arranged around a perimeter; and a plurality of waveguides, each of the waveguides respectively coupled to one of the emitters; wherein the plurality of emitters are operative to generate a single far-field peak.

Example 2 includes the emitter configuration layout of Example 1, wherein the plurality of emitters are arranged in a circular pattern around the perimeter.

Example 3 includes the emitter configuration layout of Example 1, wherein the plurality of emitters are arranged in an elliptical pattern around the perimeter.

Example 4 includes the emitter configuration layout of Example 1, wherein the plurality of emitters are arranged in a semi-circular pattern around the perimeter.

Example 5 includes the emitter configuration layout of any of Examples 1-4, wherein the plurality of emitters are arranged around the perimeter such that none of the waveguides are located between any of the emitters.

Example 6 includes the emitter configuration layout of any of Examples 1-2, wherein the plurality of emitters are arranged in at least two concentric rings, including an outer ring of emitters arranged in a circular pattern with a first radius, and at least one inner ring of emitters arranged in a circular pattern with a second radius that is less than the first radius.

Example 7 includes the emitter configuration layout of Example 6, wherein the outer ring of emitters are each positioned so as to be offset from the inner ring of emitters, such that the waveguides coupled to the inner ring of emitters respectively extend between a pair of adjacent outer ring emitters.

Example 8 includes the emitter configuration layout of any of Examples 6-7, wherein the plurality of emitters arranged in at least two concentric rings suppress fringes around a central lobe in the far-field.

Example 9 includes the emitter configuration layout of any of Examples 1-8, wherein the plurality of emitters are implemented in an integrated photonics application, a light detection and ranging (LiDAR) system, or a free-space optical communication system.

Example 10 includes an optical phased array, comprising: a plurality of emitters arranged around a perimeter, wherein the plurality of emitters include a first set of emitters having a first polarization, and a second set of emitters having a second polarization that is different than the first polarization; and a plurality of waveguides, each of the waveguides respectively coupled to one of the emitters.

Example 11 includes the optical phased array of Example 10, wherein the plurality of emitters are arranged in a circular pattern around the perimeter.

Example 12 includes the optical phased array of Example 11, wherein the first set of emitters are arranged in a first semi-circular pattern, and the second set of emitters are arranged in a second semi-circular pattern that faces the first semi-circular pattern.

Example 13 includes the optical phased array of any of Examples 10-12, wherein a far-field emission profile of light generated by the plurality of emitters includes a first lobe generated by the first set of emitters with the first polarization, and a second lobe generated by the second set of emitters with the second polarization.

Example 14 includes the optical phased array of Example 13, wherein each beam corresponding to the first lobe and the second lobe are separate beams possessing orthogonal polarization states, wherein each beam is configurable to track the other beam such that the beams overlap in the far-field.

Example 15 includes the optical phased array of Example 14, wherein the orthogonal polarization states prevent interference between the beams.

Example 16 includes an optical phased array, comprising: a plurality of emitters arranged around a perimeter, wherein the plurality of emitters include a first set of emitters having a first phase gradient and a second set of emitters having a second phase gradient that is different than the first phase gradient, the first set of emitters alternatingly arranged with the second set of emitters around the perimeter; and a plurality of waveguides, each of the waveguides respectively coupled to one of the emitters.

Example 17 includes the optical phased array of Example 16, wherein the plurality of emitters are arranged in a circular pattern around the perimeter.

Example 18 includes the optical phased array of any of Examples 16-17, wherein a far-field emission profile of light generated by the plurality of emitters includes a first lobe generated by the first set of emitters with the first phase gradient, and a second lobe generated by the second set of emitters with the second phase gradient.

Example 19 includes the optical phased array of Example 18, wherein each beam corresponding to the first lobe and the second lobe are separate beams that are independently steerable and controllable.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical phased array, comprising:
   a plurality of emitters arranged around a perimeter, wherein the plurality of emitters include a first set of emitters having a first polarization, and a second set of emitters having a second polarization that is different than the first polarization; and
   a plurality of waveguides, each of the waveguides respectively coupled to one of the emitters;
   wherein the first set of emitters are arranged in a first semi-circular pattern, and the second set of emitters are arranged in a second semi-circular pattern that faces the first semi-circular pattern.

2. The optical phased array of claim 1, wherein a far-field emission profile of light generated by the plurality of emitters includes a first lobe generated by the first set of emitters with the first polarization, and a second lobe generated by the second set of emitters with the second polarization.

3. The optical phased array of claim 2, wherein each beam corresponding to the first lobe and the second lobe are separate beams possessing orthogonal polarization states, wherein each beam is configurable to track the other beam such that the beams overlap in the far-field.

4. The optical phased array of claim 3, wherein the orthogonal polarization states prevent interference between the beams.

5. The optical phased array of claim 1, wherein the plurality of emitters are arranged around the perimeter such that none of the waveguides are located between any of the emitters.

6. The optical phased array of claim 1, wherein the plurality of emitters are grating-assisted emitters.

7. The optical phased array of claim 1, wherein the plurality of waveguides are respectively coupled to a splitter, a phase modulator, or a phase shifter.

8. The optical phased array of claim 1, wherein the plurality of emitters are implemented in an integrated photonics application.

9. The optical phased array of claim 1, wherein the plurality of emitters are implemented in a light detection and ranging (LiDAR) system.

10. The optical phased array of claim 1, wherein the plurality of emitters are implemented in a free-space optical communication system.

11. An optical phased array, comprising:
    a plurality of emitters arranged around a perimeter, wherein the plurality of emitters include a first set of emitters having a first phase gradient and a second set of emitters having a second phase gradient that is different than the first phase gradient, the first set of emitters alternatingly arranged with the second set of emitters around the perimeter; and
    a plurality of waveguides, each of the waveguides respectively coupled to one of the emitters;
    wherein a far-field emission profile of light generated by the plurality of emitters includes a first lobe generated by the first set of emitters with the first phase gradient, and a second lobe generated by the second set of emitters with the second phase gradient.

12. The optical phased array of claim 11, wherein the plurality of emitters are arranged in a circular pattern around the perimeter.

13. The optical phased array of claim 11, wherein each beam corresponding to the first lobe and the second lobe are separate beams that are independently steerable and controllable.

14. A method of fabricating an optical phased array, the method comprising:
    forming a plurality of emitters arranged around a perimeter, wherein the plurality of emitters include a first set of emitters having a first polarization, and a second set of emitters having a second polarization that is different than the first polarization; and
    forming a plurality of waveguides such that each of the waveguides is respectively coupled to one of the emitters;
    wherein the first set of emitters is formed in a first semi-circular pattern, and the second set of emitters is formed in a second semi-circular pattern that faces the first semi-circular pattern.

15. The method of claim 14, wherein the plurality of emitters are formed as grating-assisted emitters.

16. The method of claim 14, further comprising:
    coupling the plurality of waveguides to a splitter, a phase modulator, or a phase shifter.

* * * * *